United States Patent [19]

Weber et al.

[11] Patent Number: 5,106,684
[45] Date of Patent: Apr. 21, 1992

[54] FOAM SHEETS OF HIGH HEAT DISTORTION RESISTANCE

[75] Inventors: Reinhold Weber, Mutterstadt; Gerhard Alicke, Worms; Manfred Weilbacher, Frankenthal; Uwe Guhr, Gruenstadt; Klaus Hahn, Kirchheim, all of Fed. Rep. of Germany

[73] Assignee: BASF Aktiengesellschaft, Ludwigshafen, Fed. Rep. of Germany

[21] Appl. No.: 655,824

[22] Filed: Feb. 15, 1991

[30] Foreign Application Priority Data

Feb. 17, 1990 [DE] Fed. Rep. of Germany ....... 4005164

[51] Int. Cl.$^5$ ................................................ C08J 9/08
[52] U.S. Cl. ..................................... 428/332; 428/339; 521/120; 521/134; 521/139
[58] Field of Search .................... 428/332, 339, 314.8; 521/120, 121, 134, 139, 146, 189; 525/189

[56] References Cited

U.S. PATENT DOCUMENTS

| 4,919,992 | 4/1990 | Blundell et al. | 428/419 |
| 4,923,923 | 5/1990 | Struss et al. | 525/189 |
| 5,011,866 | 4/1991 | Suh | 428/314.8 |

Primary Examiner—William J. Van Balen
Attorney, Agent, or Firm—Oblon, Spivak, McClelland, Maier & Neustadt

[57] ABSTRACT

Foam sheets of high heat distortion resistance contain a) from 80 to 99% by weight of a styrene polymer and b) from 1 to 20% by weight of poly-1,4-phenylene sulfide, and, if desired, conventional additives and are produced by extrusion using a low-boiling blowing agent.

2 Claims, No Drawings

FOAM SHEETS OF HIGH HEAT DISTORTION RESISTANCE

The present invention relates to foam sheets of high heat distortion resistance, based on a mixture of a styrene polymer and poly-1,4-phenylene sulfide.

Foam sheets based on polystyrene and produced by extruding a polystyrene/blowing agent mixture have achieved considerable industrial importance as a thermal insulator, in particular in the construction industry. However, they have the disadvantage of poor heat distortion resistance, which precludes their use, for example, for roof insulation in regions of high sunshine.

It is an object of the present invention to increase the heat distortion resistance of polystyrene foam sheets and to ensure that they have low water absorption capacity and high compressive strength.

We have found that, surprisingly, this object is achieved by foam sheets based on a mixture of a styrene polymer and poly-1,4-phenylene sulfide.

The present invention accordingly provides foam sheets of high heat distortion resistance, containing
a) from 80 to 99% by weight of a styrene polymer,
b) from 1 to 20% by weight of poly-1,4-phenylene sulfide, and, if desired,
c) conventional additives in effective amounts, the sheets having
d) a thickness of from 10 to 200 mm,
e) a density of from 20 to 50 kg/m:,
f) 90% or more of closed cells,
g) a mean cell diameter of from 0.05 to 0.5 mm, and
h) a water absorption capacity of less than 1% by volume.

The present invention furthermore provides a process for producing foam sheets of this type, which comprises intimately mixing the styrene polymer with the poly-1,4-phenylene sulfide and from 7 to 16% by weight, based on the sum of a) and b), of a low-boiling blowing agent, and, if desired, conventional additives in an extruder at from 100° to 200° C., subsequently passing the mixture through a relaxation zone, extruding the mixture through a sheet die at an outlet temperature of from 100° to 130° C., and passing the resultant foam through a shaping channel.

The foam sheets of the invention contain, as component a), from 80 to 99% by weight, preferably from 82 to 98% by weight, in particular from 85 to 95% by weight, of a styrene polymer.

For the purposes of the present invention, styrene polymers are polystyrene and copolymers of styrene containing 50% by weight or more, preferably 80% by weight or more, of styrene. Examples of suitable comonomers are α-methylstyrene, ring-halogenated styrenes, ring-alkylated styrenes, acrylonitrile, esters of (meth)acrylic acid with alcohols having from 1 to 8 carbon atoms, N-vinyl compounds, such as vinylcarbazole, maleic anhydride or small amounts of compounds containing two polymerizable double bonds, such as butadiene, divinylbenzene or butanediol diacrylate.

The foam sheets contain, as component b), from 1 to 20% by weight, preferably from 2 to 18% by weight, in particular from 5 to 15% by weight, of poly-1,4-phenylene sulfide.

The mixture of components a) and b) generally has a melt flow index, measured in accordance with DIN 53735 (MFI 200/5), of from 0.1 to 20, preferably from 0.3 to 7.0, in particular from 0.5 to 5.0.

As conventional additives, the foam sheets may contain antistatics, stabilizers, dyes, pigments, lubricants, fillers, nucleating agents, flameproofing agents and/or synergists in conventional amounts. A preferred flameproofing agent is hexabromocyclododecene in an amount of from 0.5 to 3% by weight, preferably from 0.7 to 2% by weight. A preferred synergist is dicumyl in an amount of from 0.05 to 0.5% by weight.

The foam sheets furthermore contain 90% or more, preferably 95% or more, of closed cells. The cells may contain the blowing agent used in the production in gas form, so long as it does not escape into the ambient atmosphere by diffusion on storage of the sheets.

The mean cell diameter is generally from 0.05 to 0.5 mm, preferably from 0.1 to 0.2 mm.

The foam sheets according to the invention furthermore have a water absorption capacity of less than 1% by volume, preferably less than 0.3% by volume.

The sheets according to the invention generally have a dense foam skin, due to the extrusion process. The thermal conductivity (λ value) is generally from 0.0240 to 0.0300 W/mK, preferably from 0.0245 to 0.0285 W/mK. The compressive stress is generally from 0.200 to 0.500 N/mm$^2$, in particular from 0.250 to 0.420 N/mm$^2$. The heat distortion resistance at 85° C. is generally from 0 to 3%, preferably from 0 to 1%.

The sheets according to the invention are produced in a conventional manner by extruding a mixture of the polymers, a low-boiling blowing agent and, if desired, conventional additives.

The blowing agent used is a customary, low-boiling physical blowing agent which does not dissolve styrene polymers, but is soluble in the polymer melt under pressure. Examples of suitable blowing agents are $C_3$-$C_5$-hydrocarbons, such as propane, n-butane, n-pentane, i-pentane, neopentane and mixtures thereof, chlorinated hydrocarbons, such as methyl chloride and/or ethyl chloride, fluorochlorohydrocarbons, such as dichlorodifluoromethane and/or 1,1-difluoro-1-chloroethane, and carbon dioxide. The blowing agent is preferably a mixture of said compounds. The optimum composition of the mixture can easily be determined by preliminary experiments. The blowing agent is generally used in an amount of from 7 to 16% by weight, preferably from 10 to 14% by weight, based on the polymer mixture.

The intimate mixing of the components is effected in an extruder at from about 120° to 200° C. The mixture is subsequently passed through a relaxation zone, where it cools to from about 100° to 130° C. with stirring, and is extruded through a sheet die at an outlet temperature from about 100° to 130° C. The resultant foam is passed through a shaping channel. The foam webs produced in this way are subsequently trimmed, if desired provided with a groove and tongue profile and cut into sections.

In the examples, parts are by weight.

EXAMPLE 1

100 parts of a mixture of 95% by weight of polystyrene and 5% by weight of poly-1,4-phenylene sulfide (PPS) having a melt flow index (MFI 200/5) of 4.5, 0.1 part of talc as nucleating agent for regulating the cell size, 0.76 part of hexabromocyclododecane and 0.15 part of 2,3-diphenyl-2,4-dimethylbutane are fed continuously to an extruder having an internal screw diameter of 120 mm. A blowing agent mixture comprising 1.9 parts of ethyl chloride and 14 parts of dichlorodifluoromethane is injected continuously through an inlet aperture in the extruder. The gel kneaded uniformly in the extruder at 180° C. is passed through a relaxation zone and, after a residence time of 15 minutes, extruded into the atmosphere through a die measuring 300 mm by 1.5 mm at an outlet temperature of 110° C. The foam is passed through a shaping channel connected to the extruder, giving a foamed sheet having a cross section of 650 mm × 50 mm.

The product was cut into sheets measuring 600 × 50 × 1250 mm. The samples were tested after a storage time of 30 days, the λ value (thermal conductivity) in accordance with DIN 52612, the foam density in accordance with DIN 53420, the cell size in accordance with ASTM D 33842-69, the proportion of closed cells in accordance with DIN-ISO 4590, the water absorption capacity from full sheets in accordance with DIN 53434, the compressive stress in accordance with DIN 53421 and the heat distortion resistance at 85° C. in accordance with DIN 53431.

The afterburn time was determined by the following test:

A sheet sample 20 mm in thickness cut out of the center of the sheet to be tested was treated on the long side 10 times with a 5 cm propane flame. The mean was taken of the afterburn times of these 10 tests, measured until extinction. This value is known as the afterburn time.

EXAMPLE 2

Example 1 was repeated, but using 100 parts of a mixture of 90% by weight of polystyrene and 10% by weight of PPS. The mixing temperature was 180° C., and the die outlet temperature was 112° C.

EXAMPLE 3

Example 1 was repeated, but using 100 parts of a mixture of 85% by weight of polystyrene and 15% by weight of PPS. The mixing temperature was 180° C., and the die outlet temperature was 115° C.

EXAMPLE A (Comparison)

Example 1 was repeated, but using 100 parts of polystyrene. The mixing temperature was 180° C., and the die outlet temperature was 105° C.

The results of the examples are shown in the table.

TABLE

| Example | Proportion of closed cells % | Water absorption capacity V % | Density kg/m³ | Afterburn time sec | Compressive stress N/mm² | | | No. of cells cells/mm | | | Heat distortion resistance at 85° | | |
|---|---|---|---|---|---|---|---|---|---|---|---|---|---|
| | | | | | perp. direction | long. direction | transv. direction | perp. direction | long. direction | transv. direction | perp. direction | long. direction | transv. direction |
| A | 97.3 | 0.085 | 33.9 | 0.8 | 0.326 | 0.248 | 0.172 | 6.5 | 8.5 | 7.4 | +0.46 | +0.85 | +5.32 |
| 1 | 96.9 | 0.12 | 35.9 | 1.9 | 0.364 | 0.275 | 0.203 | 7.8 | 8.6 | 10.1 | +0.09 | +0.74 | +1.98 |
| 2 | 98.5 | 0.090 | 41.6 | 7.1 | 0.438 | 0.362 | 0.246 | 7.1 | 9.3 | 9.6 | +0.03 | +0.13 | +0.83 |
| 3 | 97.1 | 0.13 | 44.0 | 8.5 | 0.426 | 0.456 | 0.312 | 6.8 | 6.8 | 8.3 | +0.00 | +0.00 | +0.41 |

We claim:
1. A foam sheet of high heat distortion resistance, containing
    a) from 80 to 99% by weight of a styrene polymer,
    b) from 1 to 20% by weight of poly-1,4-phenylene sulfide, and, if desired,
    c) conventional additives in effective amounts, the sheets having
    d) a thickness of from 10 to 200 mm,
    e) a density of from 20 to 50 kg/m:,
    f) 90% or more of closed cells,
    g) a mean cell diameter of from 0.05 to 0.5 mm, and
    h) a water absorption capacity of less than 1% by volume.
2. A process for producing a foam sheet as claimed in claim 1, which comprises intimately mixing the styrene polymer with the poly-1,4-phenylene sulfide and from 7 to 16% by weight, based on the sum of a) and b), of a low-boiling blowing agent and, if desired, conventional additives in an extruder at from 120° to 200° C., subsequently passing the mixture through a relaxation zone, extruding the mixture through a sheet die at an outlet temperature of from 100° to 130° C., and passing the resultant foam through a shaping channel.

* * * * *